United States Patent
Dunn

(10) Patent No.: US 6,906,715 B1
(45) Date of Patent: Jun. 14, 2005

(54) SHADING AND TEXTURING 3-DIMENSIONAL COMPUTER GENERATED IMAGES

(75) Inventor: Mark Dunn, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 09/831,240
(22) PCT Filed: Nov. 8, 1999
(86) PCT No.: PCT/GB99/03706
§ 371 (c)(1),
(2), (4) Date: May 3, 2001
(87) PCT Pub. No.: WO00/28482
PCT Pub. Date: May 18, 2000

(30) Foreign Application Priority Data

Nov. 6, 1998 (GB) .............................. 9824411

(51) Int. Cl.[7] .............................. G06T 15/40
(52) U.S. Cl. ................. 345/421; 345/422; 345/426; 345/441; 345/506; 345/582
(58) Field of Search ............................... 345/421, 422, 345/426, 441, 506, 582, 419, 424

(56) References Cited

U.S. PATENT DOCUMENTS 5,428,724 A   6/1995  Silverbrook
5,729,672 A * 3/1998  Ashton ...................... 345/589
6,476,807 B1 * 11/2002 Duluk et al. ................ 345/421

OTHER PUBLICATIONS

Winner, et al. "Hardware Accelerated Rendering of Anti-aliasing Using A Modified A–Buffer Algorithm" *Computer Proceedings*, Addison Wesley, Aug. 3, 1997, pp. 307–316.
"High Speed Algorithm for Integrated Rendering Using Adaptive Under–Sampling", *IBM Technical Disclosure Bulletin*, vol. 34 No. 1, Jun. 1991, pp. 441–446.

* cited by examiner

*Primary Examiner*—Kimbinh T. Nguyen
(74) *Attorney, Agent, or Firm*—Flynn, Thiel, Boutell & Tanis, P.C.

(57) ABSTRACT

A method and apparatus for shading and texturing 3-dimensional computer generated images deals with punch through textures by supplying data defining a group of surfaces representing each object in the image. For each elementary area of the display, a depth value is generated for each surface of each object in dependence on the distance of that surface from an image plane. Shading and texture data is applied to the surfaces. A determination is made as to whether or not any texture applied to a surface is fully opaque. The depth values are stored for opaque textures at the appropriate elementary areas. The depths of surfaces from subsequent objects are then compared with depth values for the opaque objects at elementary areas and, surfaces or subsequent objects for elementary areas which have a fully opaque surface closer to the image plane than the surface being considered are discarded.

14 Claims, 5 Drawing Sheets

TRADITIONAL RENDERING PIPELINE

FIG. 3 PVR RENDER PIPELINE WITH PUNCH THROUGH

SHADING AND TEXTURING 3-DIMENSIONAL COMPUTER GENERATED IMAGES

FIELD OF THE INVENTION

This invention relates to a method and apparatus for shading and texturing 3-dimensional computer generated images.

BACKGROUND OF THE INVENTION

The standard method used when generating 3 dimensional images for shading and texturing is the z or depth buffer system. This has been in use for many years and is now an industry standard.

In our British Patent No. 2281682, we have proposed an alternative method with many advantages over the z buffer system. It is a ray casting technique in which each object (polygon) in an image is defined by a set of infinite surfaces which are tagged as forward or reverse facing. A ray from a viewpoint is cast into the scene and intersections with the surfaces are determined along with the distance of the intersections from an image plane. By analysing this data, it is possible to determine which surface of each polygon is visible for each pixel and thus it is possible to shade and texture the pixel. The technique may be implemented by using a pipeline of processing elements, each of which can perform a ray surface interception calculation to determine the depth value for that surface for each pixel in turn. When the depth value for a surface at a pixel has been determined, using these processing elements it is stored in a depth or z buffer with data identifying the surface. The z buffer information can then be read out and used by a texturing device to apply texture data for display via a frame store.

Surfaces in the system can be opaque or they may have translucency. Blending values can be associated with the surfaces to enable translucency effects to be displayed. For example, a cloud may be modelled as a translucent surface by assigning the RGB values to define its colour and an alpha blending value to define its translucency. The degree of translucency is controlled by modulating the alpha value of the texture map across the surface. A commonly used blending mode is known as alpha blending where successive polygons are blended into the frame buffer and put into the equation:

RGB(new)=alpha*RGB(frame buffer)+(1−alpha)*RGB(texture)

This technique is well known. A restriction when using alpha blending is, that in order to render a correctly blended image, the pixels which display the polygons must be presented to the blending unit in depth order rendered from back to front so that each contribute the correct amount for the final image. For a z buffer system, this ordering is typically performed by the application software that is feeding the z buffer. This is referred to as pre-sort mode. The ray casting technique can use either the pre-sort mode or an automatic pixel accurate type of sort.

There is a special case of translucent texture referred to as "punch through". This is defined as a translucent texture where the alpha component is restricted to be either "on", i.e., fully transparent, or "off", i.e., fully opaque. This type of texture is very common in 3-D game applications for two reasons; firstly it allows complex scenes like forests to be modelled using relatively few polygons; a nd, secondly, a traditional z buffer can correctly render punch through translucency irrespective of the order in which polygons are presented to the system.

A traditional z buffer pipeline with alpha testing for translucency is shown in FIG. 1. In this, polygons to be rendered are first scan line converted in the polygon scan converter 2 and the resulting x, y, z, u, v, w values are then fed to the texturing unit and to the depth test unit (the z buffer). Texture addresses are sent to texture memory. Texture values retrieved from texture memory pass to a texture filter 4 which reduces aliasing artifacts introduced by the texture resampling process. The filtered values are passed to a texture blend unit 6 which blends the texture values with the base colour and highlights of the polygon. Next, an alpha test is performed on the alpha component of the resulting pixel in an alpha test unit 8. The test is against a reference alpha value.

The alpha test unit performs a magnitude comparison with an alpha reference value. The user supplies the alpha reference value, and a compare mode which is one of "never", "less", "equal", "less or equal", "greater", "not equal", "greater or equal", or "always". The test selected depends on the type of image the user is creating. The alpha test unit outputs whether or not the compare mode has been passed or failed by the input alpha value.

If the result of the alpha test is a pass, then the depth test is performed on the z value and RGB values in the z buffer updated. If the test is failed, then no further processing of pixels takes place. Thus, in the typical case where the reference alpha is one and the test is greater than or equal, then only opaque pixels are written to the frame buffer, and these pixels are depth tested against all other polygons in the scene, irrespective of the order in which polygons are processed. The depth test is performed by a depth test unit 10 which reads z values from the z buffer 12 via a stencil unit 14 and is able to write the z values directly to the z buffer store. The depth test conditions are shown in FIG. 1 next to the depth test unit.

FIG. 2 shows the ray casting technique of our British Patent No. 2281682 with deferred texturing, that is to say, texturing data is applied at the end of the ray/surface intersection testing process. The apparatus comprises a polygon set-up unit which provides data which defines the plane equations of the polygons. This data is then fed to an array of processing elements 22, each of which is able to perform one ray/surface intersection test and can produce a depth value for that ray/surface intersection. Typically, the processing array operates on a sub-set of the whole image known as a "tile" which is e.g., 32×32 pixels and operates on one polygon at a time. The depth values computed are stored in a tile depth store 24.

Depth and surface values from the tile depth store are applied to a parallel runlength encoder 26. Encoder 26 provides an output to the texturing unit via an XY address for a pixel which is fed to a polygon scan conversion unit 28 and a tag which goes to the polygon setup unit 30. Unite 30 calculates the plane equations for the texturing and shading, and recalculates the plane equations of the polygons.

The polygon setup unit 30 receives the polygon texture data and then provides data to the polygon scan conversion unit 28. The RGB values and alpha values and highlights applied to a surface are then sent to a texture blending unit 32 where they are combined with RGB and alpha values from texture memory via a filter 34 and are then passed to the tile accumulation buffer 38. From buffer 38 the combined RGB and alpha data are sent to the main frame store for the image.

The advantage of deferring texturing until all the ray/surface intersections have been performed is that texture and shading operations then only occur on visible pixels. Thus, effective fill rate it increased by the ratio of occluded to visible pixels in the scene. By definition, in a deferred texturing pipeline the depth test occurs before the texturing takes place and, therefore, also takes place before the alpha test. As a result, it is not possible to correctly render the punch through textured polygons unless they are either presented in back to front order and are non-overlapping, or they are subject to a pixel accurate pre-sorting operation earlier in the pipeline. The first of these arrangements imposes an unnecessary restriction in the software driver. The second requires an unnecessary processing overhead.

SUMMARY OF THE INVENTION

We have appreciated that by including a feedback loop to the depth store from the results of the alpha test for each pixel and deferring the updating of the depth store until the results of the alpha test for each pixel are known the above problem may be overcome. This requires both feedback from the alpha testing to the depth testing and feedforward from the depth test unit to the alpha blending unit.

Using this idea enables four standard modes of operation to be used as follows:

A standard z buffer no-sort, punch through compatibility mode;

An enhanced punch through mode with no-sort and deferred operation;

An enhanced punch through mode with auto-sorting surfaces and deferred operation;

Generalised auto-sort alpha blend mode.

BRIEF DESCRIPTION OF THE DRAWINGS

These modes of operation and preferred embodiments of the invention will now be described in detail by way of example with reference to the accompanying drawings in which.

DETAILED DESCRIPTION

Figure 2:
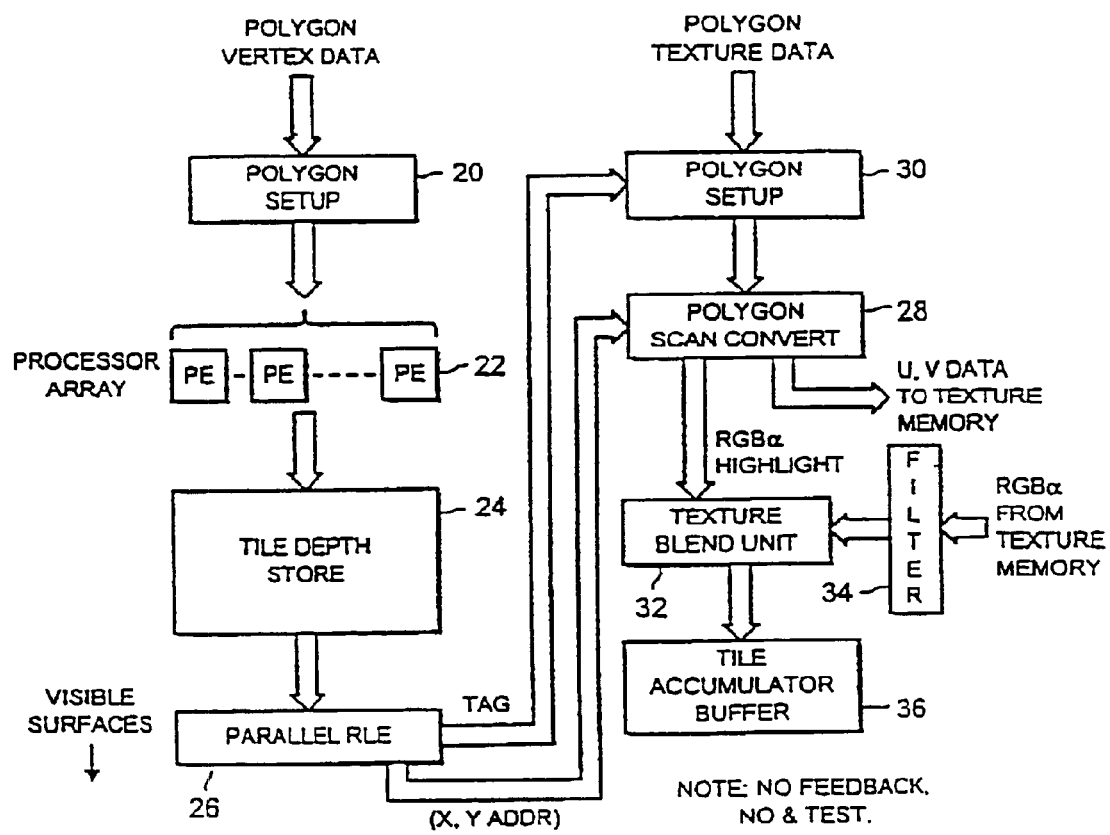
FIG. 2 is the prior art ray casting system with deferred texturing.
Figure 3:
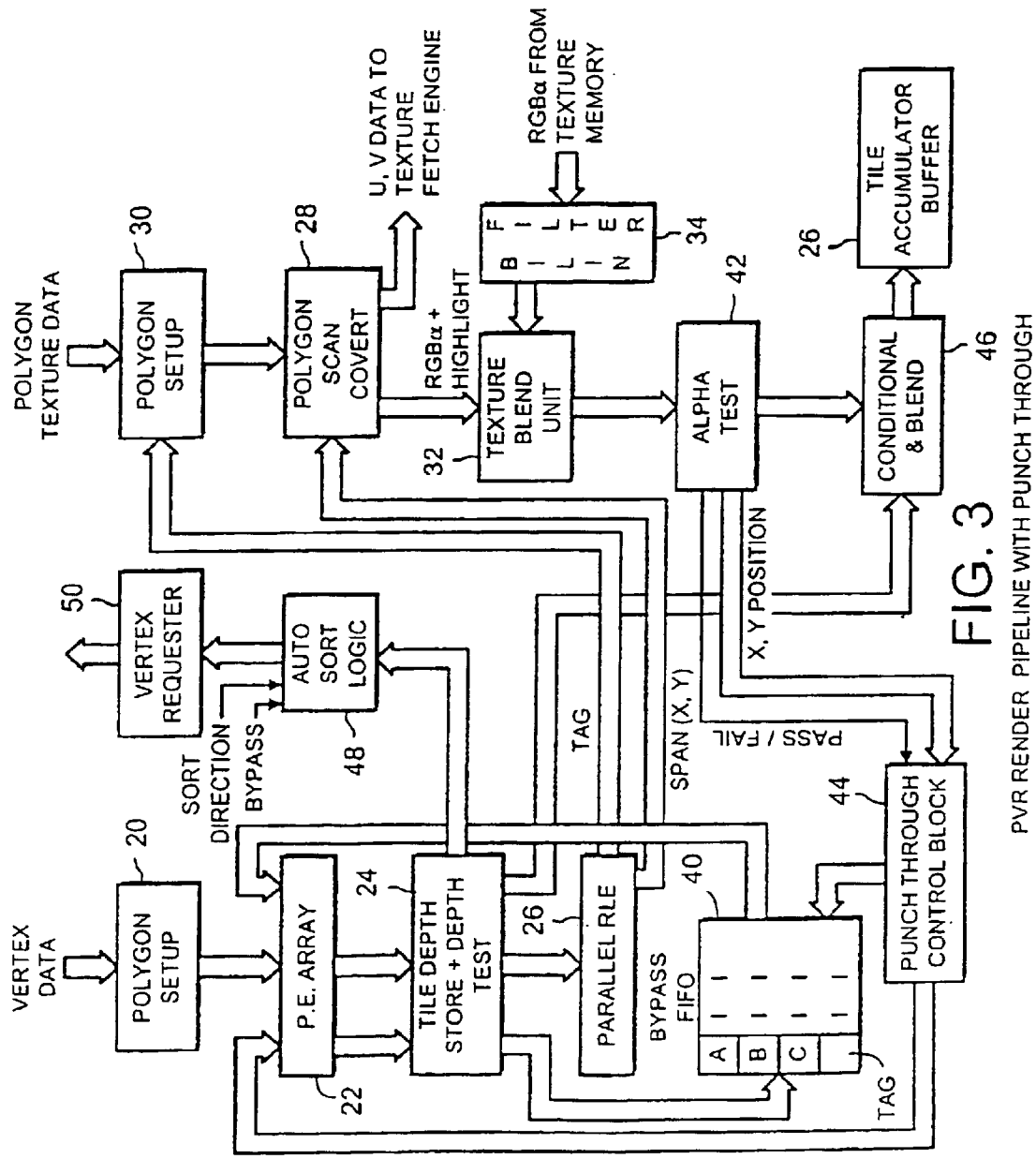
FIG. 3 is an embodiment of the present invention.

The block diagram of FIG. 3 is a modification of that of FIG. 2 in accordance with an embodiment of the invention.

As in FIG. 2, a polygon setup block 20 receives polygon vertex data before supplying polygon surface data to the processor element array 22 which computes the depths of each surface at each pixel and stores them. This also includes a depth tester 24 to determine the closest surface to the image plane for each pixel. Depth tester 24 supplies the standard ABC and tag parameters which are used to define each surface to a bypass FIFO store 40. Bypass FIFO store 40, in turn, can supply those parameters back to the processor element array 22 when controlled to take this action.

XY address data and tag data are supplied by the parallel runlength encoder 26 to the polygon setup unit 30 and the polygon scan converter 28 in a similar manner to FIG. 2. The polygon setup unit 30 receives polygon texture data from the texture store. The blending unit 32 and filter 34 operate in a similar manner to that of FIG. 2. However, after the texture blending unit 32, an alpha test unit 42 is provided. Alpha test unit 42 has a pass/fail output which is used to control a punch through control block 44. Punch through block 44 also receives an alpha value and position data from the alpha test unit 42. The alpha test unit 42 has an output to a conditional blend unit 46 which can blend the textured data directly with data from the tile depth store 24 before supplying the data to the tile accumulation buffer 36.

There is also an auto sort logic unit 48, for surface data, connected to the tile depth store 24. Unit 48 sends data to a vertex requester 50 which then ensures that polygon vertex data is supplied in an appropriate order to the polygon setup unit 20.

Auto sort logic unit 48 has a sort direction control so that it can sort surfaces from front to back and from back to front and also a bypass control to inhibit its use. Use of the circuitry will be described in four different modes.

The z buffer is such a widely used rendering algorithm that it is useful to have a mode of operation which emulates this since this is schematically what many programmers will be familiar with. Thus, the advantages of the ray casting rendering algorithm are obtained while appearing to be operating in a z buffer mode.

In this mode, polygons bypass the auto sort logic unit 48 as a result of a control signal sent to its bypass input. Instead, they pass to the depth test unit associated with tile depth store 24 unsorted. Rather than perform the depth calculation at this point, the standard ABC and tag parameters which form the basis of the ray casting technique are stored in the bypass FIFO 40 and the screen XY locations and tag values are forwarded to the deferred texturing unit for each surface in turn.

Figure 1:
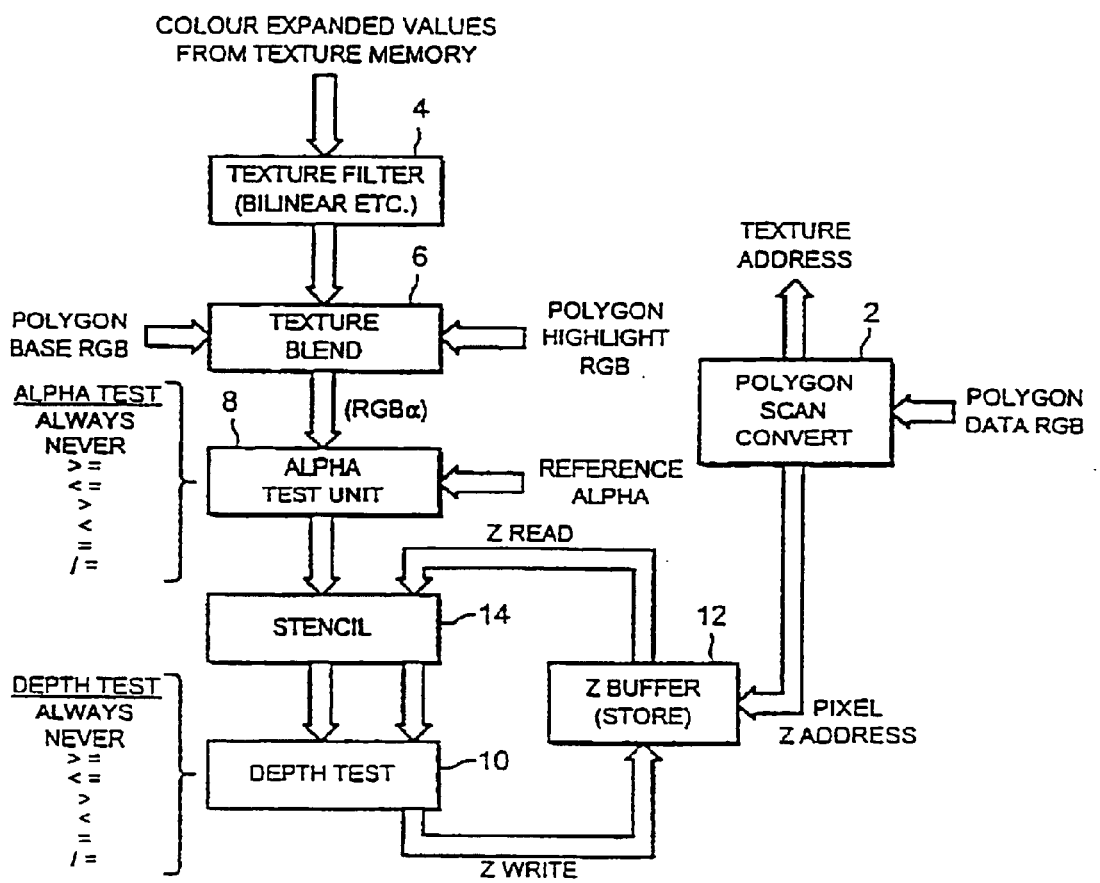
FIG. 1 is the prior art z buffer system described above.

In this mode of operation texturing is not deferred, as all pixels are presented to the texture unit regardless of whether they have been occluded by a previously rendered opaque pixel which is closer to the eyepoint in the current pixel. The texture unit processes "texels" (texture elements) in the order in which they are presented. Texels are filtered, blended with the polygon base colour, and any highlights, and are alpha tested in the same way as for a traditional z buffer (see FIG. 1). For each pixel, if the alpha test is passed, the corresponding depth is calculated from the stored ABC and tag parameters in FIFO 40 which are fed back to the processor element array 22 and then into the tile depth store 24. The corresponding depth is then calculated with the associated depth test unit and the tile depth store is updated. The pixel RGB value is then blended into the tile accumulation buffer by the conditional alpha blend unit 46. This process continues until all the polygons in the scene have been processed. The speed of operation of this is equivalent to a standard z buffer since all the polygons have to be textured and shaded. There are no economies to be made by only texturing and shading the visible polygons.

The second mode of operation is one in which punch through control is used to speed up processing but there is no sorting of polygons and surface data prior to shading and texturing. The mode is the same as that described for z buffer operation with the exception that the polygons are depth tested against the current contents of the tile depth store before being passed to the texturing unit. Punch through textures are detected by the alpha test unit 42 which sends signals to punch through control unit 44 to send the punch through surfaces back to the processor element array 22.

They are then sent to the tile depth store and depth test unit 26 which tests them against the current contents of the store. If they are closer to the image plane then the stored surface, they replace the current contents. If a succeeding polygon or a part of a polygon is occluded at a particular pixel by a previously rendered opaque pixel, then it is not sent to the texturing unit. Thus, the degree of fill rate improvement over the z buffer system will depend on two factors; firstly, the order in which the polygons are presented; and, secondly, the latency between the depth test and the alpha test. For example, if polygons happen to be presented in a back to front order and the polygons are non-overlapping, the fill rate will be identical to the z buffer system. If, on the other hand, the polygons happen to be presented in front to back order, in a 0 latency system, the fill rate requirement will be reduced by the ratio of ideal occluded pixels in the scene to visible pixels in the scene, (i.e., the depth complexity). The effect of latency in the system is to reduce the efficiency of this process, since for a finite time window (the degree of latency in the system), a proportion of pixels which could have been identified as occluded in a 0 latency system will be passed to texturing unit and will consume texturing bandwidth. This latency is inherently because there is a time period which will be taken to texture the first polygon to pass through the texturing unit and alpha and depth test it. Once this initial latency has been overcome, the processor element arrangement and the tile depth store and depth test unit 24 will be provided with depths for new polygons and performing depth tests on previously rendered polygons when the result of the alpha test is that the pixel in question is a punch through pixel occluding other pixels in the scene.

A third mode of operation is a deferred texturing pipeline process which uses a translucency sorting algorithm.

As described above, the degree of fill rate improvement provided by the invention depends on the order in which the polygons are presented. The advantage of using punch through control in combination with pixel accurate auto sorting is such that a system can ensure that polygons and parts of polygons are always processed in optimal order. The auto sort algorithm for punch through processing differs from the algorithm for alpha blend processing in two key respects. Firstly, the punch through pixels are sorted from front to back rather than back to front. This is because if there is a punch through pixel, it will have an alpha value of 1 and no surfaces behind that will contribute to the shade and texture applied to that pixel. Secondly, the sorting overhead can be reduced by decomposing the sort list into smaller chunks. We shall refer to this as "chunking".

Figure 4:
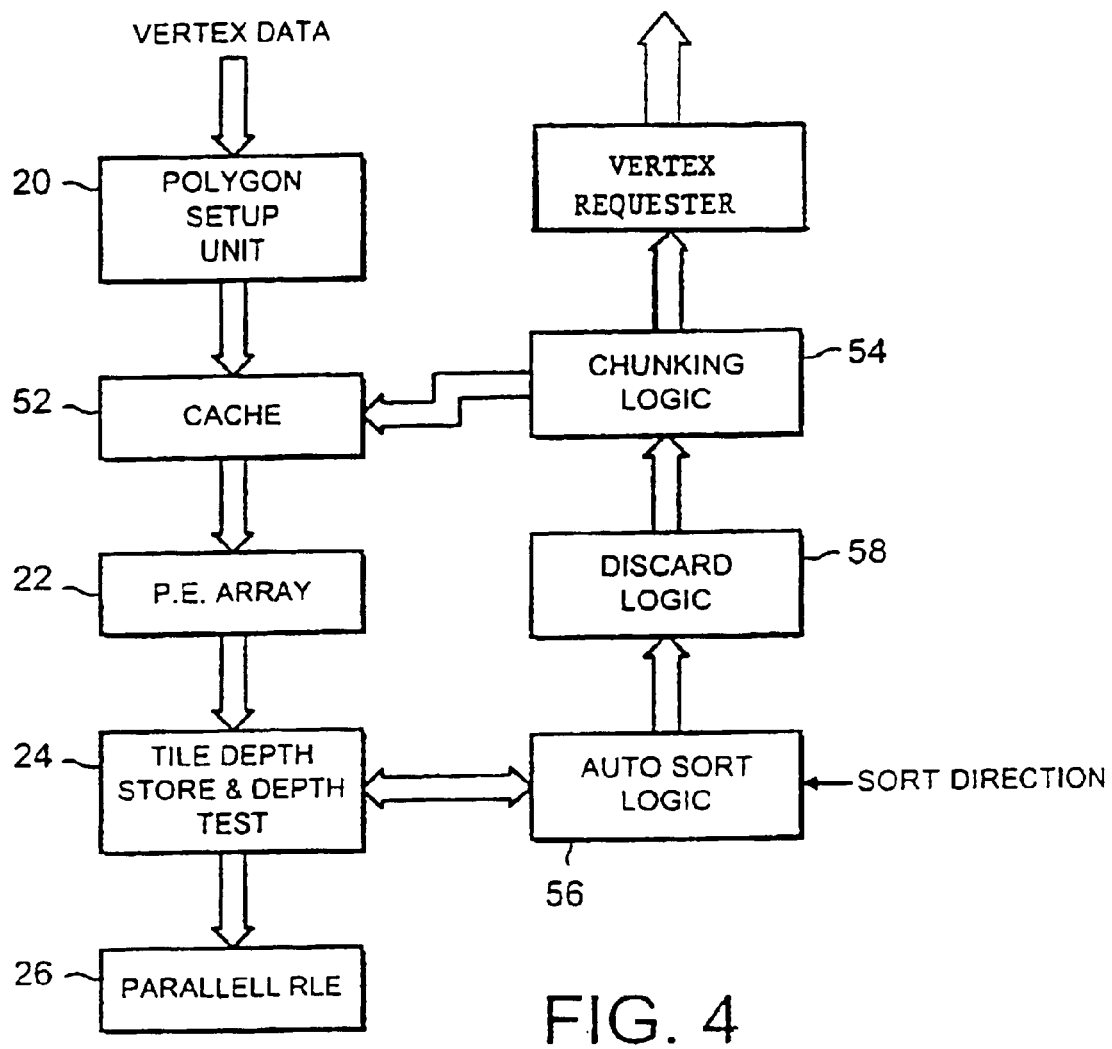
FIG. 4 is a further preferred embodiment of the invention with an auto-sort unit.

We shall describe the operation of punch through auto sort algorithms with reference to FIG. 4. This shows the portion of FIGS. 2 and 3 which performs the ray casting algorithm but does not show the texturing hardware.

As can be seen, a cache memory 52 is provided between the polygon setup unit 20 and the processing element array 22. The tile depth store and depth test unit 24 has an output to Auto Sort logic 54 which is coupled to auto discard logic 58 and chunking logic 54. The chunking logic has an output back to the cache 52 and also to vertex requester unit 50. The Auto Sort logic 56 comprises at least one additional tile depth store for temporary storage of data. When looking for opaque surfaces these are not required as a comparison with the currently stored depth determines whether or not an opaque pixel is closer than the current depth. They are used when sorting translucent objects. These additional depth stores could be provided in the tile depth store and depth test unit 24.

Figure 5:
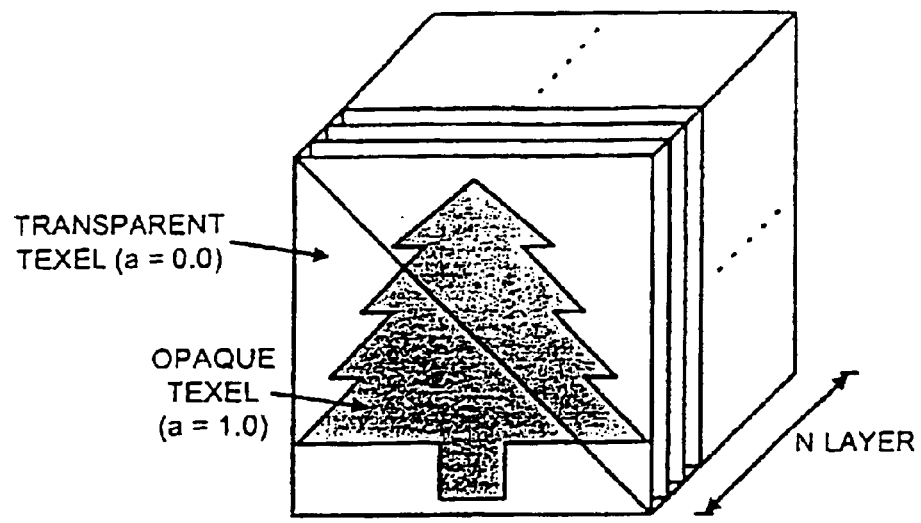
FIG. 5 shows schematically the auto-sort scheme for polygons.

Because punch through textures are typically used to model complex structures such as forests and cloud scenes, is the number of polygons used for punch through is generally much greater than that used for alpha blended translucency. Consequently, the processing overhead for sorting has to be minimised to make the system efficient. A simple algorithm to sort n object into an ascending or descending order would require $n^2$ operations. This is illustrated in FIG. 5 in which a tree punch through texture can be seen on the front surface, which has opaque texels in the region of the tree and transparent ones around it. Auto sorting is performed by rendering all of the translucent polygons in order to recognise the bottom layer. Therefore, the number of polygons per tile processed is the number of polygons multiplied by the number of layers which is $2n^2$.

Figure 6:
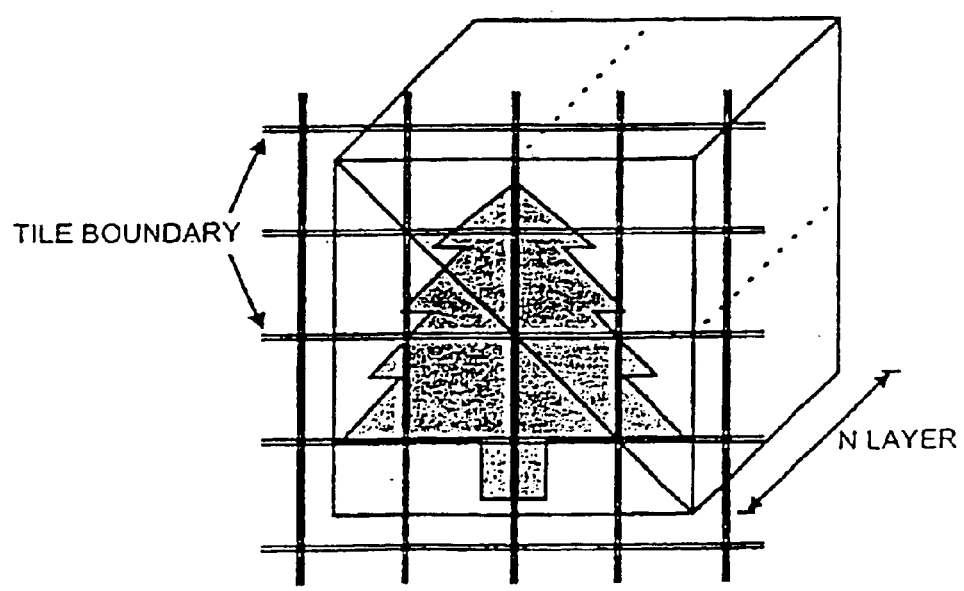
FIG. 6 shows schematically a further auto-sort scheme for polygons.

If each object selected is discarded from the sorting operation, the number of operations is $$n+n-1+n-2+\ldots+1$$

which is approximately equal to $n^2/2$. The characteristic of punch through sorting is that the sort can be chunked without introducing any visual errors. For chunking, the number of operations is $MOD(n/m)*m2+REM(n/m)^2$, where n is the chunk size. Reducing the chunk size reduces both the sorting overhead and the efficiency of the sort. Any real implementation of this algorithm will be a trade-off between the computing resource available used in the sort algorithm and the efficiency of the punch through operation. The benefit of chunking is that it increases the degree of freedom with in which this trade-off can be explored. The sorting algorithm can be further optimised unless it can terminate early, at the point at which all the pixels in a tile have become validated (i.e., they have been assigned a valid opaque depth). This is illustrated with reference to FIG. 6. In tile (a) the nearest polygon hides all polygons behind it. Therefore, the number of polygons processed to n.

A single pass through the punch through sorting algorithm will find the closest polygon to the image plane for each pixel. Then, in the case of tile (a), the first pass will determine that a closest opaque polygon has been found for each pixel in the tile, and therefore no further passes are necessary.

Chunks of polygon data are supplied to the tile depth store, depth test logic and auto sort logic by the chunking logic 54. They then provide into the discard logic polygons which are no longer required.

The auto sort logic then sorts the polygons to be rendered in a direction controlled by a sort direction input and supplies them to cache memory 52 from where they can then be sent again to the processor element array 22 and eventually on through to the texturing unit. Thus, the auto sort logic sorts the polygons into front to back order and when used in the apparatus of FIG. 3, is able to significantly reduce the processing overhead in complex scenes, since the closest fully opaque pixels will be processed first and polygons behind these will not need to be textured.

The fourth mode of operation of the circuit of FIG. 3 is a generalised auto sort alpha blend mode.

With state of the art graphic controllers performing bi-linear and tri-linear texturing as standard operations, the blocky visual nature of punch through textures is becoming less acceptable. Typical art work for, say, a tree texture would be punch through (i.e., fully opaque) in the body of the tree and alpha blended (i.e., partially translucent) of the extremities of the leaves. It is possible with the circuit of FIG. 3 to correctly render this type of alpha blended texture whilst still retaining the benefit of deferred texturing.

In order to do this, two passes through the tree surface data would be made. In the first pass, the punch through portion of each polygon in a tile is processed as described in the auto sort mode above. The alpha test unit 42 is set to pass only fully opaque texels, so that at the end of the pass the tile depth buffer contains the depth of the closest fully opaque texel to the eye for each pixel position in the tile. In the second pass, the auto sort algorithm sorts the pixels from back to front, and the depth test is set to "greater than" so that for each visible polygon fraction, only the non-opaque (i.e., the alpha blended fringe of the leaves in the tree example) is passed to the texturing unit. Because the second pass sorts back to front, any overlapping partially translucent textures will be correctly blended. The second pass should be very efficient because in a typical scene, (i.e., a punch through forest) only a small percentage of the total pixels in the polygon list will pass the depth test. The suitability of this technique for general alpha blended textures depends on the proportion of opaque texels to translucent texels in the texture maps. In the tree example, the algorithm would be most suitable. If, however, all the textures were clouds and contained no opaque pixels, then standard auto sorting would be the preferred method.

It will therefore be appreciated from the above that methods and apparatus which operate according to the ray casting technique for rendering 3-dimensional images can be modified to obtain the benefit of reduced processing overheads from punch through textures, thus speeding up the operation of the system. The use of the punch through textures is particularly beneficial in scenes where there are a large number of overlapping punch through textures such as cloud scenes or forests. The use of the punch through processing means that only the polygon closest to the viewpoint for each pixel has to have a texture value applied to it. Without this operation it would be necessary to apply textures to all the polygons which intercept the ray which passes through that pixel. In a scene such as a forest, this could easily lead to several thousand texturing operations being required for each pixel instead of one. Thus, very complex scenes can be textured at much higher speeds than would otherwise be possible.

What is claimed is:

1. A method for shading and texturing a 3-dimensional computer generated image for presentation of the image on a display, the display consisting of a plurality of elementary areas, said method including the steps of:

supplying data defining a set of surfaces that represent each object in the image;

for each elementary area of the display, based on the surface-defining data, generating a depth value for the object surfaces that may be visible at the elementary area as a function of the distances of the object surfaces at the elementary area from an image plane;

determining translucency values for texture data to be applied to object surfaces at an elementary area to determine whether or not, at the elementary area, the object surfaces are opaque;

for a first opaque object surface at the elementary area, storing the depth value for the surface;

for one or more subsequent opaque object surfaces at the elementary area, for each opaque object surface, comparing the depth value of the subsequent opaque object surface to the stored depth value for the opaque object surface at the elementary area and for which the depth value is stored; and between consecutive said steps of comparing depth values, if, in said step of comparing the depth value of the subsequent opaque object surface to the stored depth value it is determined that the subsequent opaque object surface is closer to the image plane than the opaque object surface associated with the stored depth value, replacing the stored depth value with the depth value for the subsequent opaque object surface;

wherein only after said step or said steps of comparing the depth value of the subsequent opaque object surface to the stored depth value and replacing the stored depth value with the depth value for the subsequent opaque object surface are executed, at the elementary area, rendering the opaque object surface for which, at the elementary area, the depth value is stored.

2. The method of claim 1, wherein said step of rendering the opaque object surface comprises surface shading and texturing the opaque object surface.

3. The method of claim 1, wherein:

the image is divided into a plurality of rectangular areas; and said steps of determining translucency values, storing the depth value for the first opaque object surface, comparing the depth values of the subsequent opaque object surfaces and replacing the stored depth value are performed on a rectangular area by rectangular area basis.

4. The method of claim 1, wherein:

after said steps of comparing the depth value of a subsequent opaque object surface to the stored depth value and, if said comparison indicates that the subsequent object surface is behind the opaque object surface for which a depth value is stored, the surface defining data for the subsequent opaque object surface is discarded;

after said steps of comparing the depth value of the subsequent opaque object surface to the stored depth value and replacing the stored depth value with the depth value of the subsequent opaque object surface are fully executed for the subsequent opaque object surface, the object surfaces are sorted back to front relative to the image plane wherein the first surface is the opaque object surface; and after said back to front object surface sorting, the opaque object surface is subjected to shading and texturing based on the data for non-opaque object surfaces forward of the opaque object surface.

5. An apparatus for shading and texturing a 3-dimensional computer generated image for presentation of the image on a display, the display consisting of a plurality of elementary areas, said apparatus including:

means for supplying data defining a set of surfaces that represent each object in the image;

means for generating a depth value for each object surface that may be visible at an elementary area of the display based on the surface-defining data as a function of the distance of the object surface at the elementary area from an image plane;

means for determining translucency values for texture data to be applied to object surfaces at the elementary area to determine whether or not, at the elementary area, the object surfaces are opaque;

means for receiving the object surface depth value of a first opaque object surface of the object surfaces at the elementary area, and storing the depth value for the first opaque object surface;

means for receiving, for a subsequent opaque object surface at the elementary area, the depth value of the subsequent opaque object surface and for comparing the stored depth value of the subsequent opaque object surface to the stored opaque object surface depth value at the elementary area, said means for receiving and comparing the depth value of the subsequent opaque object surface configured to receive and compare the depth values of each subsequent opaque object surface present at the elementary area;

a data overwrite means connected to said means for receiving and comparing the depth value of the subsequent opaque object surface, wherein, for each comparison, if said means for receiving and comparing the depth value of the subsequent opaque object surface determines that the subsequent opaque object surface is closer to the image plane than the opaque object surface for which a depth value is stored, said data overwrite means replaces the stored depth value with the depth value for the subsequent opaque object surface; and means for rendering the object surface for which, at the elementary area, the depth value is stored, wherein said means for rendering is configured to take place only when said means for rendering receives an indication that said means for receiving and comparing the depth value of the subsequent opaque object surface has completed the comparisons for the subsequent opaque object surfaces.

6. The apparatus of claim 5, wherein said means for rendering comprises means for surface shading and texturing the object surface for which, at the elementary area, the depth value is stored.

7. The apparatus of claim 5, furthering including:

means for discarding surface data for discarding the surface data for the object surfaces behind the most forward opaque object surface;

means for sorting the object surfaces back to front relative to the image plane, said sorting means configured to sort the object surfaces after said means for receiving and comparing the depth value of the subsequent opaque object surface, compares the depth values of each subsequent opaque object surface at the elementary area;

shading and texturing means for shading and texturing the opaque object surface at the elementary area based on the object surface data for the object surfaces located forward of the opaque object surface.

8. A method for shading and texturing a 3-dimensional computer generated image for presentation of the image on a display, the display consisting of a plurality of elementary areas, said method including the steps of:

supplying data defining a set of surfaces that represent each object in the image;

for each elementary area of the display, based on the surface-defining data, generating a depth value for the object surfaces that may be visible at the elementary area as a function of the distances of the object surfaces at the elementary area from an image plane;

based on the depth values for the object surfaces, at each elementary area, sorting the object surfaces in front to back order from the image plane;

after said sorting step, at each elementary area, for the sorted object surfaces, starting with the most forward object surface determining whether or not the object surface is completely opaque;

if, it is determined that an object surface is completely opaque at an elementary area:

at that elementary area, discarding the surface-defining data for the object surfaces behind the opaque object surface;

at the elementary area, applying shading and texturing to the opaque object surface.

9. The method of claim 8, wherein:

after said step of discarding the surface-defining data for the object surfaces behind the opaque object surface, sorting the object surfaces from back to front relative to the image plane; and after said step of back to front surface sorting, performing said step of shading and texturing the image at the elementary area based on the non-completely opaque surface data for the surfaces located forward of the completely opaque surface.

10. The method of claim 8, wherein:

said step of determining whether or not at an elementary area an object surface is completely opaque is performed by:

obtaining data for the object surface defining the texture of the object surface including data describing the opacity of the object surface; and based on the texture-defining data for the surface at the elementary area, determining whether or not, at the elementary area, the surface is completely opaque; and said step of determining whether or not, at an elementary area, an object surface is completely opaque is not performed for surfaces after the most forward surface that is completely opaque.

11. The method of claim 8, wherein:

the image is divided into a plurality of rectangular areas; and said steps of sorting the object surfaces front to back and determining whether or not, at an elementary area, an object surface is completely opaque are performed on a rectangular area by rectangular area basis.

12. An apparatus for shading and texturing a 3-dimensional computer generated image for presentation of the image on a display, the display consisting of a plurality of elementary areas, the apparatus including:

means for supplying data defining a set of surfaces that represent each object in the image;

means for generating a depth value for the surfaces of each object that may be visible at each elementary area of the display, based on the surface-defining data, said means for generating a depth value for the object surfaces as a function of the distances of the object surfaces at the elementary area from an image plane;

means for sorting the object surfaces that may be visible at an elementary area in a front to back order from the image plane based on the depth values for the object surfaces;

means for determining whether or not an object surface at each elementary area is completely opaque, wherein said means for determining whether or not an object surface is completely opaque is configured to receive the object surface defining data for the object surfaces in the sorted front to back surface order based on the sorting performed by said means for sorting the object surfaces;

means for discarding the surface-defining data for the object surfaces behind the first determined completely opaque object surface at the elementary area; and means for applying shading and texturing to the first determined completely opaque object surface at the elementary area.

13. The apparatus of claim 12, wherein:

means for sorting the object surfaces from back to front relative to the image plane is provided that receives the surface defining data after the surface-defining data for the object surfaces behind the opaque surfaces are discarded; and said means for applying shading and texturing to the completely opaque object surface performs the shading and texturing for each elementary area based on the non-complete opaque surface data for the surfaces located forward of the completely opaque object surface.

14. The apparatus of claim 12, wherein said means for determining whether or not at an elementary area an object surface is completely opaque is configured to: obtain data for the object surface defining the texture of the surface including data describing the opacity of the surface; and based on the texture-defining data for the surface at the elementary area, determining whether or not at the elementary area the object surface is completely opaque.

\* \* \* \* \*